(12) United States Patent
Li (10) Patent No.: US 12,167,510 B2
(45) Date of Patent: Dec. 10, 2024

(54) HIGH FREQUENCY AND POWER-ADJUSTABLE ELECTRONIC HEATING TYPE DEVICE AND METHOD FOR OPERATING THE SAME

(71) Applicant: Innoscience (Suzhou) Technology Co., Ltd., Suzhou (CN)

(72) Inventor: Weipeng Li, Suzhou (CN)

(73) Assignee: INNOSCIENCE (SUZHOU) TECHNOLOGY CO., LTD., Suzhou (CN)

( * ) Notice: Subject to any disclaimer, the term of this patent is extended or adjusted under 35 U.S.C. 154(b) by 1034 days.

(21) Appl. No.: 17/251,224

(22) PCT Filed: Nov. 19, 2020

(86) PCT No.: PCT/CN2020/130254
§ 371 (c)(1),
(2) Date: Dec. 11, 2020

(87) PCT Pub. No.: WO2022/104664
PCT Pub. Date: May 27, 2022

(65) Prior Publication Data
US 2022/0368229 A1    Nov. 17, 2022

(51) Int. Cl.
*H05B 3/02* (2006.01)
(52) U.S. Cl.
CPC ..................... *H05B 3/02* (2013.01)
(58) Field of Classification Search
None
See application file for complete search history.

(56) References Cited

U.S. PATENT DOCUMENTS

| 5,959,443 A | 9/1999 | Littlefield |
| 2015/0048807 A1 | 2/2015 | Fan et al. |

FOREIGN PATENT DOCUMENTS

| CN | 104868722 A | * | 8/2015 | ............. H02M 1/08 |
| CN | 105281556 A | | 1/2016 | |
| CN | 109863584 A | | 6/2019 | |
| WO | 2018153171 A1 | | 8/2018 | |

OTHER PUBLICATIONS

International Search Report and Written Opinion of the corresponding PCT application No. PCT/CN2020/130254 mailed on Aug. 18, 2021.

* cited by examiner

*Primary Examiner* — Thor S Campbell
(74) *Attorney, Agent, or Firm* — JCIPRNET (57) ABSTRACT

The subject application provides a portable electronic heating type device with an improved power converter topology configured for receiving a DC input voltage from the power supply and generate an AC output voltage to the heating element. The power converter is based on an inductor, a DC blocking capacitor and only one switching device. Heating power can be adjusted under a pulse-width-modulation mode, a fixed-on-time mode, a fixed-off-time mode or a frequency-modulation mode. The portable electronic heating type device has less switching loss and faster response. Therefore, it can be operated at higher frequency and more compact in size.

19 Claims, 11 Drawing Sheets

HIGH FREQUENCY AND POWER-ADJUSTABLE ELECTRONIC
HEATING TYPE DEVICE AND METHOD
FOR OPERATING THE SAME

TECHNICAL FIELD

The subject application generally relates to an electronic heating type device, and more particularly to an electronic heating type device based on a high frequency and power-adjustable single-switch power converter topology.

BACKGROUND

Four-switch non-inverting buck-boost converter topology is commonly used for regulating the output power of batteries in electronic heating type devices such as electrical thermo bottles, electronic scent diffusers and electronic cigarettes. For example, in an electronic scent diffuser or an electronic cigarette, a typical four-switch non-inverting buck-boost converter may be used to provide regulated power to heat a resistance wire to vaporize solution stored in an atomization core to release vapor. As different users may want to have different releasing rates of vapor or a particular user may want to have different releasing rates of vapor in different situations, there is always demand for wide-range and high-response adjustable heating power for improving user experience. On the other hand, the power supply run time and compactness are also crucial to portability of a product.

SUMMARY

An object of the subject application is to provide a portable electronic heating type device with an improved power converter topology.

According to one aspect of the subject application, the subject application provides an electronic heating type device comprising: a power supply having a positive terminal and a negative terminal; a heating element having a first terminal and a second terminal; a power converter configured for receiving a DC input voltage from the power supply and generate an AC output voltage to the heating element, the power converter comprising: an inductor having a first terminal and a second terminal, the first terminal of the inductor being electrically connected to the positive terminal of the power supply; a DC blocking capacitor having a first terminal and a second terminal, the first terminal of the DC blocking capacitor being electrically connected to the second terminal of the inductor and the second terminal of the DC blocking capacitor being electrically connected to the first terminal of the heating element; and a power switch having a first power terminal, a second power terminal and a control terminal, the first power terminal of the power switch being electrically connected to the second terminal of the inductor and the first terminal of the DC blocking capacitor; and a controller having a control driving node electrically connected to the control terminal of the power switch and being configured to generate a control driving signal to switch on the power switch for an on-time $t_{ON}$ and switch off the power switch for an off-time $t_{OFF}$ alternately such that: when the power switch is switched on, the inductor is charged up with a charging current supplied by the power supply; energy generated from the power supply is transferred and stored in the inductor; the DC-blocking capacitor is discharged through a RC circuit formed with the heating element, energy stored in the DC-blocking capacitor is transferred to the heating element to generate heating power; when the switch is switched off, the inductor is discharged with a discharging current flowing through a LCR circuit formed with the DC-blocking capacitor and the heating element; energy stored in the inductor is transferred through the DC-blocking capacitor to the heating element to generate heating power.

As there is only one switching device, the improved power converter topology has less switching loss. Therefore, the portable electronic heating type device can have a longer battery run time. Besides, owning to the simplified control scheme for one switching device, shorter computation time is required for the controller to generate control signals. Therefore, the provided portable electronic heating type device can have faster response and operate at a higher frequency (>3 Mhz). Also, thanks to the reduced number of switches, less circuitry layout area is required. Since smaller sizes of inductors and capacitors can be selected for higher frequency operation, the overall circuitry layout can be further decreased. Therefore, the portable electronic heating type device can be more compact in size.

BRIEF DESCRIPTION OF THE DRAWINGS

Preferred embodiments of the subject application are described in more detail hereinafter with reference to the drawings, in which.

DETAILED DESCRIPTION

In the following description, embodiments of electronic heating type device are set forth as preferred examples in accordance with the subject application. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Reference in this specification to "one embodiment" or "an embodiments" means that a particular feature, structure, or characteristic described in connection with the embodiment is included in at least one of the embodiments of the invention. The appearances of the phrase "in one embodiment" or "in some embodiments" in various places in the specifications are not necessarily all referring to the same embodiments, nor are separate or alternative embodiments mutually exclusive of other embodiments. Moreover, various features are described which may be exhibited by some embodiments and not by others.

Figure 1A:
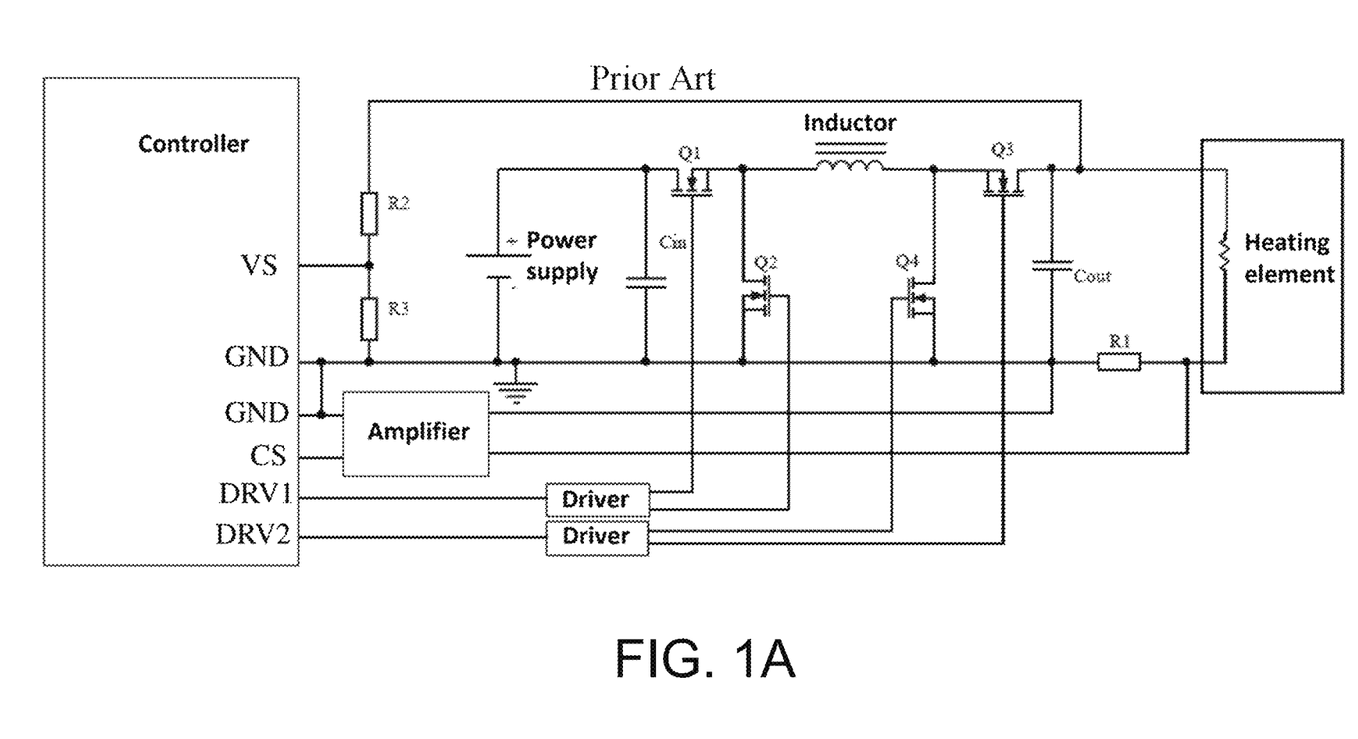
FIG. 1A-1C are schematic diagrams of an electronic heating type device based on a four-switch buck-boost converter according to a prior art embodiment of the subject application.

FIG. 1A depicts a schematic diagram of an electronic heating type device based on a four-switch buck-boost converter according to a prior art embodiment of the subject application. The electronic heating type device may comprise: a power supply; a heating element; and an inductor for storing energy generated by the power supply.

The electronic heating type device may further comprise: a first power switch Q1 having a first power terminal connected to the inductor and a second power terminal connected to an input capacitor; a second power switch Q2 having a first power terminal connected to the inductor and the first power switch Q1 and a second power terminal connected to the ground GND; a third power switch Q3 having a first power terminal connected to the inductor and a second power terminal connected to an output capacitor Cout; a fourth power switch Q4 having a first power terminal connected to the inductor and the third power switch Q3 and a second power terminal connected to the ground GND.

The electronic heating type device may further comprise: a controller, a first driver and a second driver. The first driver may comprise: an input terminal connected to a first control node DRV1 of the controller; a first driving terminal connected to a control terminal of the first power switch Q1; and a second driving terminal connected to a control terminal of the second power switch Q2. The second driver may have an input terminal connected to a second control node DRV2 of the controller; a third driving terminal connected to a control terminal of the third power switch Q3 and a fourth driving terminal connected to a control terminal of the fourth switch Q4.

The controller may be configured to generate a first control signal to the first driver and a second control signal to the second driver. In response to the first control signal, the first driver may be configured to generate a first driving signal to turn on and off the first switch Q1 and a second driving signal to turn on and off the second switch Q2. In response to the second control signal, the second driver may be configured to generate a third driving signal to turn on and off the third switch Q3 and a fourth driving signal to turn on and off the fourth switch Q4.

Figure 1B:
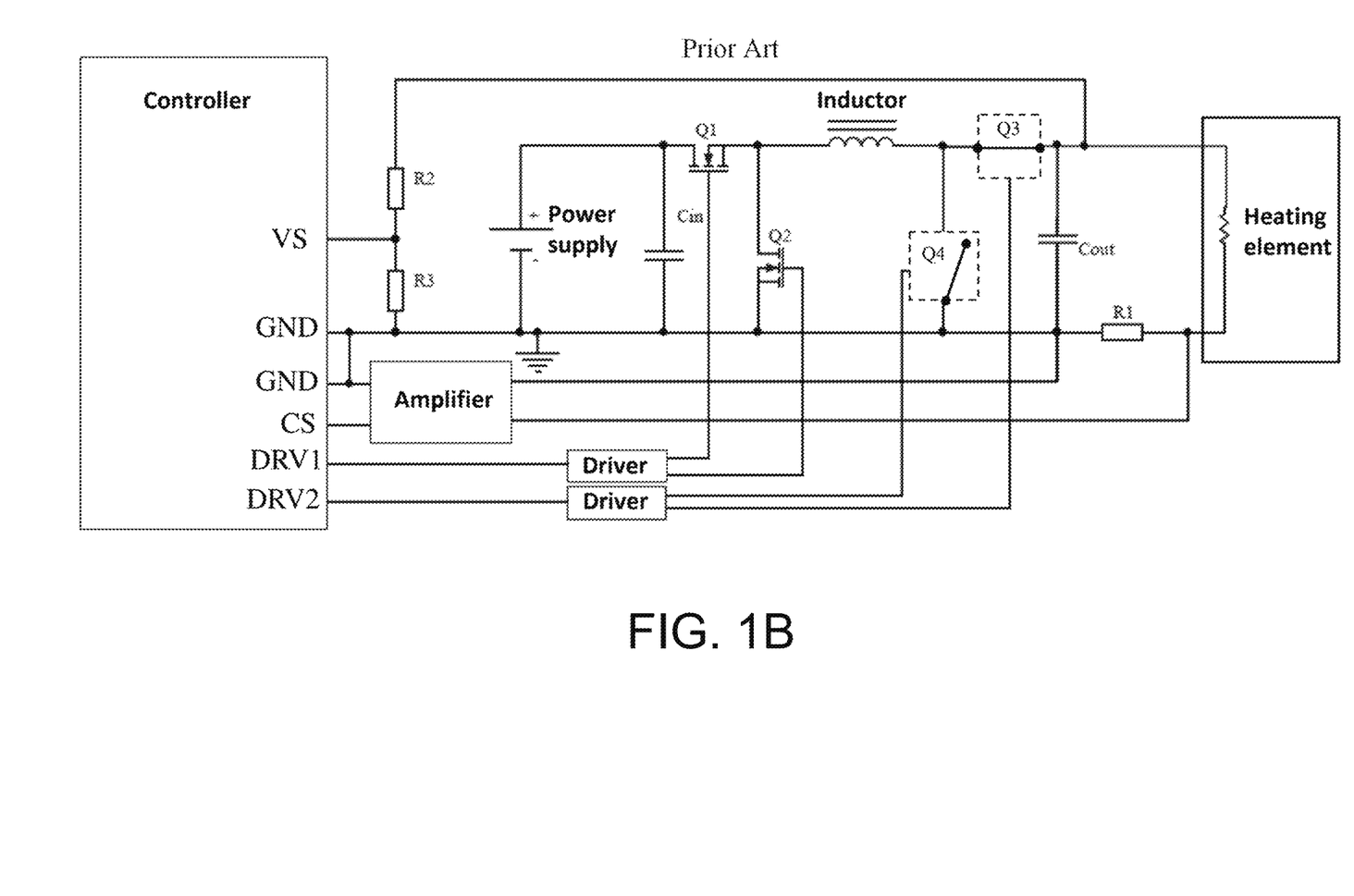

Referring to FIG. 1B. The four-switch buck-boost converter topology may be configured to be operated as a buck converter, wherein the fourth switch Q4 is turned off (opened); the third switch Q3 is turned on (closed); the first switch Q1 and the second switch Q2 are switched on and off alternately such that the first switch Q1 and the second switch Q2 are complementary in operation with one being turned on while the other is turned off.

Figure 1C:
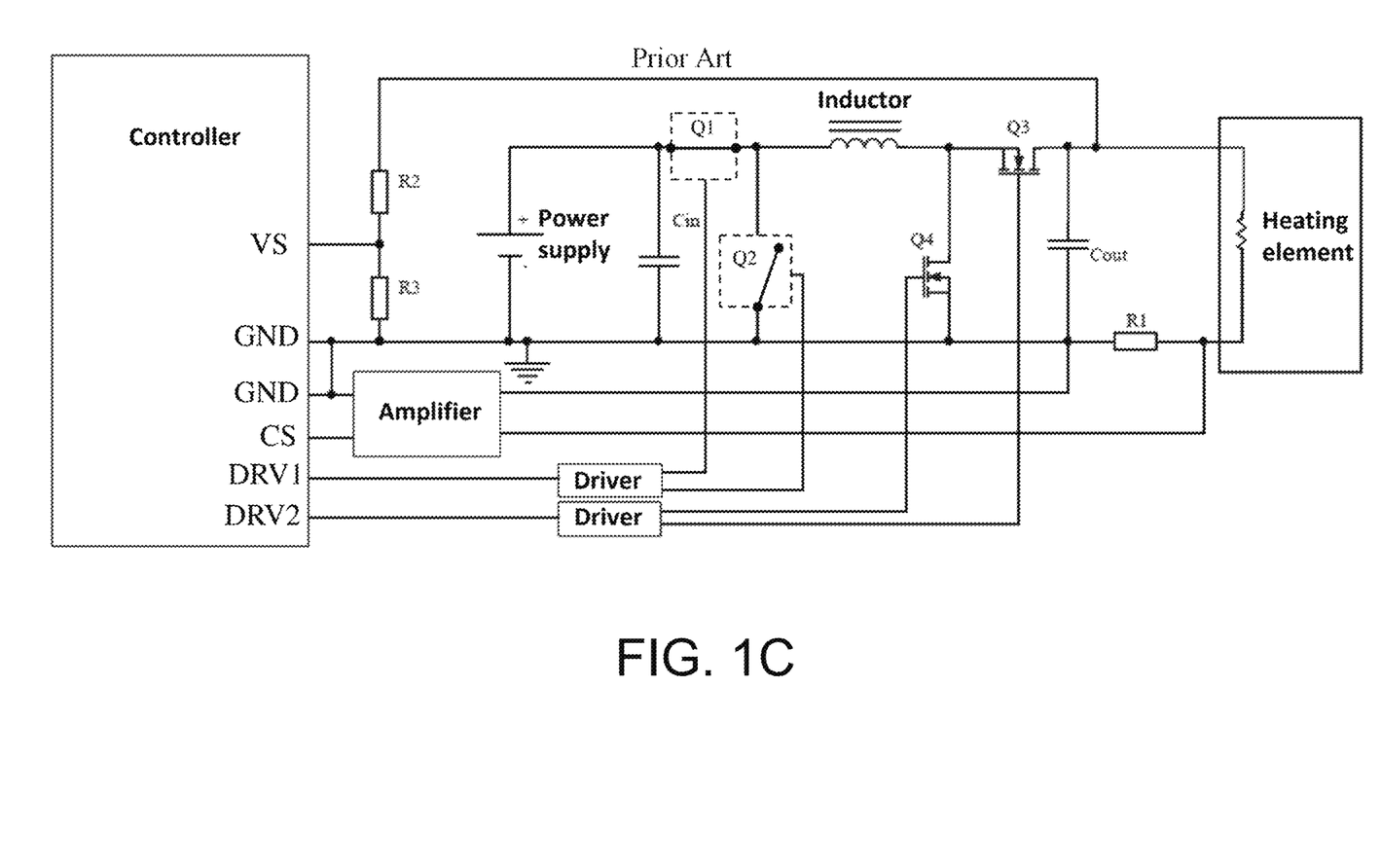

Referring to FIG. 1C. The four-switch buck-boost converter topology may be configured to be operated as a boost converter, wherein the second switch Q2 is turned off (opened); the first switch Q1 is turned on (closed); the third switch Q3 and the fourth switch Q4 are switched on and off alternately such that the third switch Q3 and the fourth switch Q4 are complementary in operation with one being turned on while the other is turned off.

No matter whether the four-switch buck-boost converter is operated as a buck or boost converter, three out of the four switches have switching and/or conducting losses which result in high power consumption and significantly shorten power supply run time for the electronic heating type device. Moreover, the electrical layout area required for four switching devices are too big to meet the needs of miniaturization for portability of the electronic heating type device.

Figure 2:
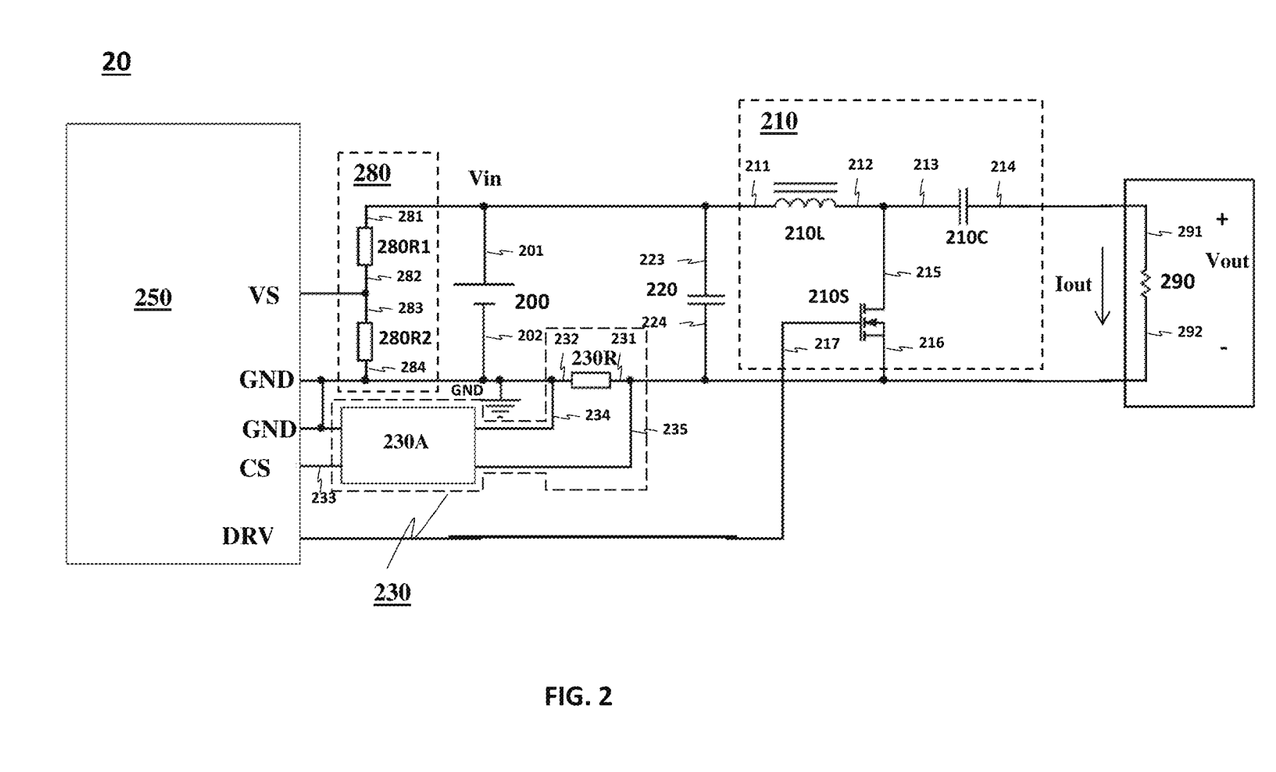
FIG. 2 is a schematic diagram of an electronic heating type device based on a single-switch power converter topology according to an embodiment of the subject application.

FIG. 2 is a schematic diagram of an electronic heating type device 20 based on a single-switch converter topology according to an embodiment of the subject application. The electronic heating type device 20 may comprise: a power supply 200 having a positive terminal 201 and a negative terminal 202; a heating element 290 having a first terminal 291 and a second terminal 292; and a power converter 210 configured for receiving a DC input voltage Vin from the power supply 200 and generates an AC output voltage Vout to the heating element. The power supply 200 may be a DC power supply constructed with one or more lithium-ion battery, lead acid battery, sodium ion battery or any other types of DC power supply.

The electronic heating type device 20 may comprise an input filtering capacitor 220 having a first terminal 223 and a second terminal 224. The first terminal 223 is electrically connected to the positive terminal 201 of the power supply 200. The input filtering capacitor 220 may have a capacitor of Cin and be configured to filter high frequency noise from the power supplied by the power supply 200 to provide a stable DC voltage.

The power converter 210 may comprise an inductor 210L having a first terminal 211 and a second terminal 212; and an output DC blocking capacitor 210C having a first terminal 213 and a second terminal 214. The first terminal 211 of the inductor 210L may be electrically connected to the positive terminal 201 of the power supply 200. The second terminal of the inductor 210L may be electrically connected to the first terminal 213 of the capacitor 210C. The second terminal of the capacitor 210C may be electrically connected to the first terminal 291 of the heating element 290.

The power converter 210 may further comprise a power switch 210S having a first power terminal 215, a second power terminal 216 and a control terminal 217. The first power terminal 215 is electrically connected to the second terminal 212 of the inductor 210L and the first terminal 213 of the capacitor 210C.

Preferably, the switch 210S may be constructed with a transistor. The transistor may be HEMT (High electron mobility transistor) or a MOSFET (Metal Oxide Semiconductor Field Effect Transistor). The MOSFET may be selected from a N-channel enhancement type MOSFET, a N-channel depletion type MOSFET, a P-channel enhancement type MOSFET, or a P-channel depletion type MOSFET. The transistor may be formed of or include a direct bandgap material, such as an III-V compound, which includes, but not limited to, for example, GaAs, InP, GaN, InGaAs and AlGaAs.

The switch 210S may be constructed with a N-channel enhancement type MOSFET having a drain being the first power terminal 215, a source being the second power terminal 216 and a gate being the control terminal 217.

The electronic heating type device may further comprise a controller 250 having a control driving node DRV, a current sensing node CS configured to receive a current sensing signal, and a voltage sensing node VS configured to receive a voltage sensing signal. The controller may be a micro-processor unit or a digital processing unit.

The node DRV of the controller 250 may be electrically connected to the control terminal 217 of the power switch 210S. The controller may be configured to generate a control signal $V_{DRV}$ to turn on and off the switch 210S through the control driving node DRV.

Figure 3:
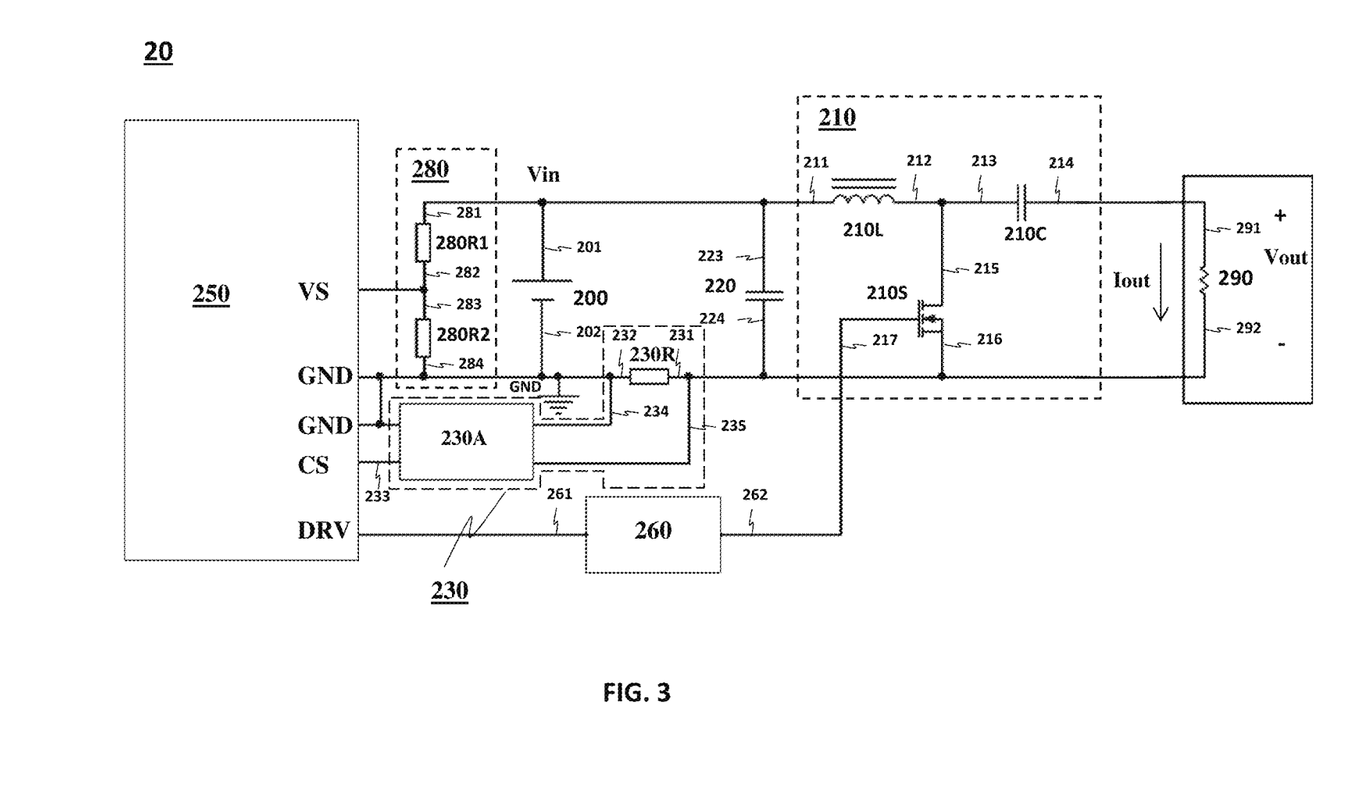
FIG. 3 is a schematic diagram of an electronic heating type device based on a single-switch power converter topology according to another embodiment of the subject application.

FIG. 3 is a schematic diagram of an electronic heating type device based on a single-switch converter topology according to another embodiment of the subject application.

Referring to FIG. 3. The electronic heating type device may further comprise a switch driver 260 for amplifying the control signal $V_{DRV}$. The switch driver may comprise an input terminal 261 electrically connected to the node DRV of the controller; and an output terminal 262 electrically connected to a control terminal 217 of the power switch 210S. The controller 250 may be configured to generate a control signal $V_{DRV}$ to the switch driver 260. In response to the signal $V_{DRV}$, the driver 260 may be configured to generate a driving signal to turn on and off the switch 210S. In some embodiments, the driver 260 may be, for example but not limited to a push-pull amplifier.

Figure 4A:
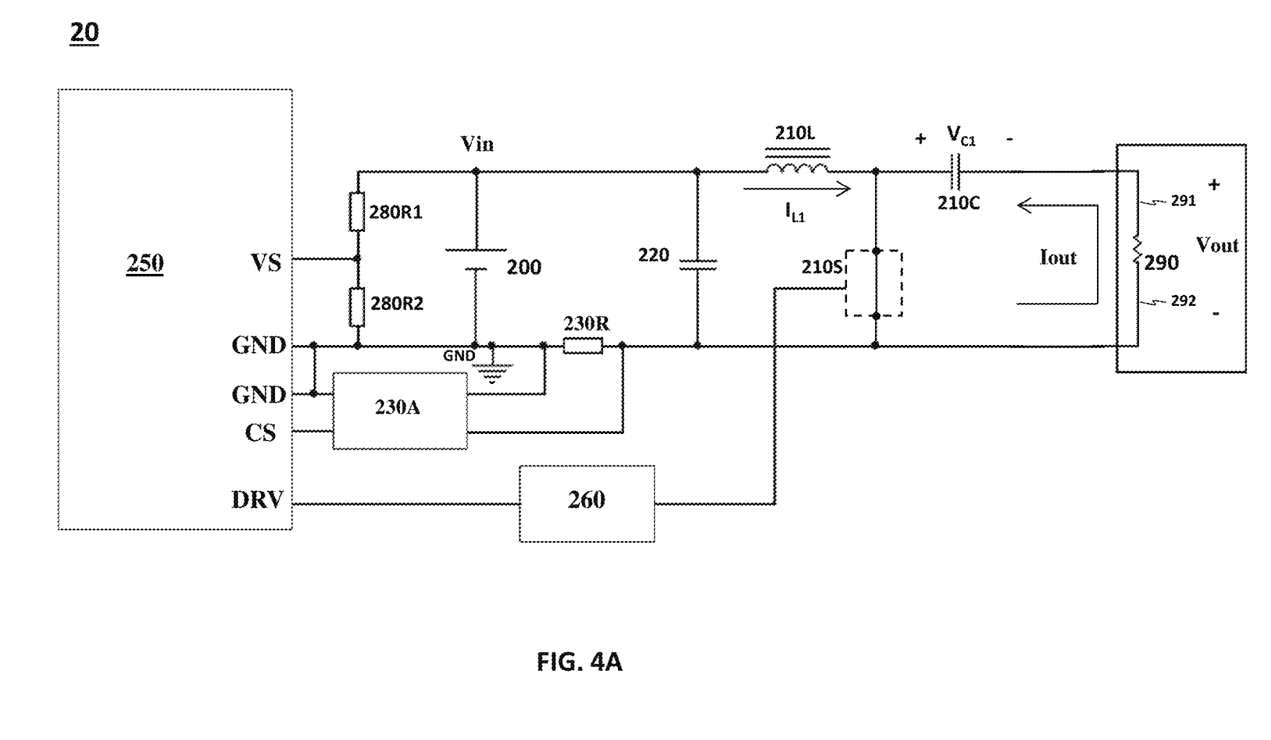
FIGS. 4A and 4B depicts schematic diagrams of the electronic heating type device of FIG. 3 with the switch being switched on and off respectively.
Figure 4B:
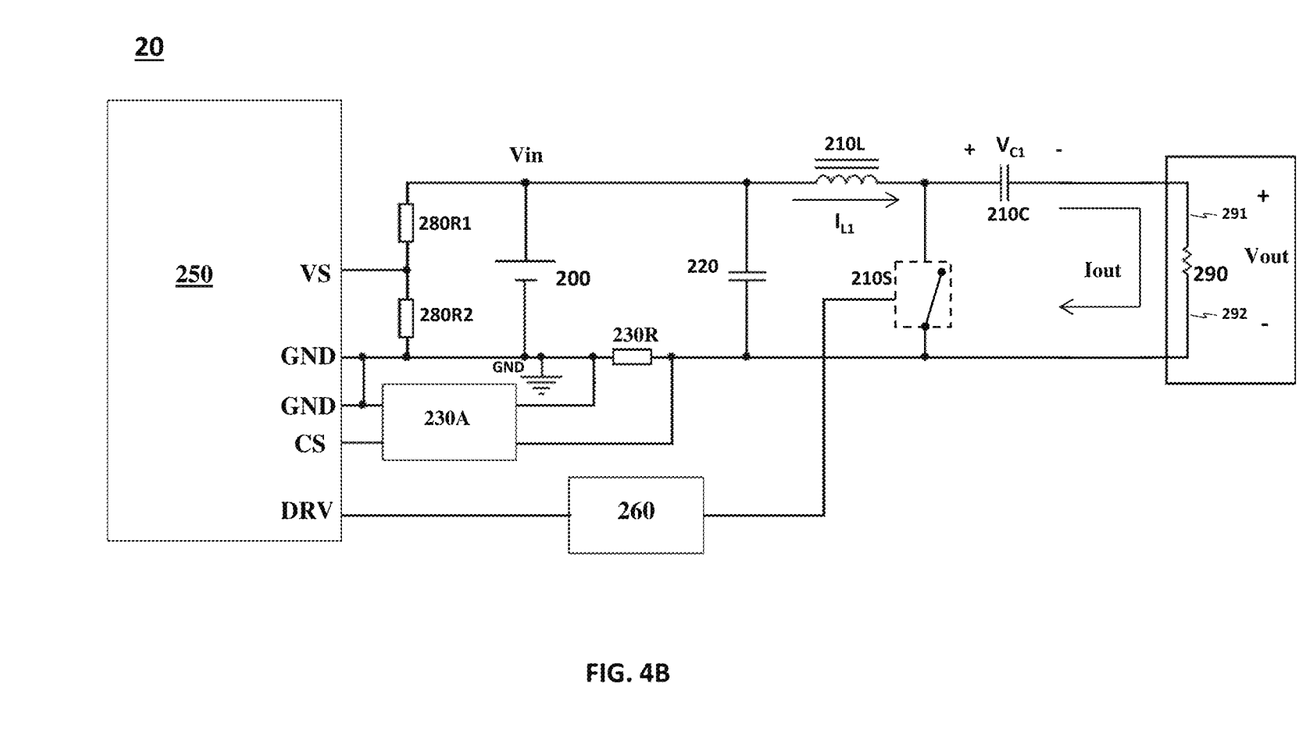
Figure 5:
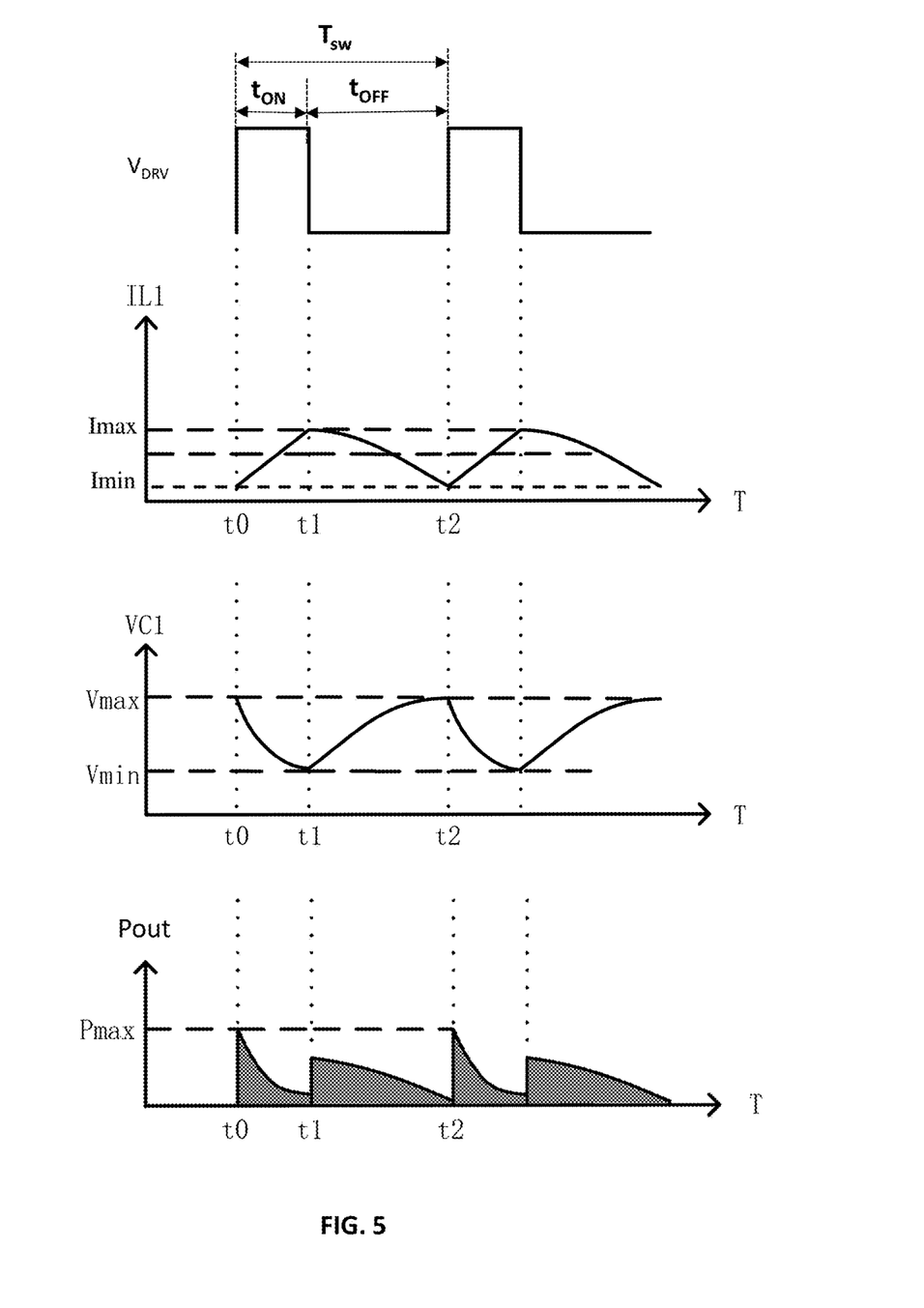
FIG. 5 depicts exemplary waveforms of the electronic heating type device according to an embodiment of the present invention.

The controller may be further configured to control the switch 210S to switch on the power switch for an on-time $t_{ON}$ and switch off the power switch for an off-time $t_{OFF}$ alternately. FIGS. 4A and 4B depicts schematic diagrams of the electronic heating type device with the switch 210S being switched on and off respectively. FIG. 5 depicts signal waveforms of the electronic heating type device over a switching cycle Tsw according to some embodiments of the present invention.

Referring to FIGS. 4A and 5. When the switch 210S is switched on (closed) at t0, and remains closed from t0 to t1 for an on-time $t_{ON}$, the inductor 210L is charged up with a charging current $I_{L1}$ supplied by the power supply 200. The current $I_{L1}$ flowing through the inductor 210L increases from a minimum current Imin to a maximum current Imax from t0 to t1 as shown in FIG. 5. Energy generated from the power supply 200 is transferred to and stored in the inductor 210L.

The capacitor 210C is discharged through a RC circuit formed with the heating element 290 and generates a current $I_{out}$ flowing from the secondary terminal 292 to the first terminal 291 of the heating element 290. The voltage $V_{C1}$ across the DC-blocking capacitor 210C decreases from a maximum voltage Vmax to a minimum voltage Vmin from t0 to t1 shown in FIG. 5. Energy stored in the DC-blocking capacitor is transferred to the heating element 290 and generate a heating power $P_{out}$.

The heating power $P_{out}$ may be given by $P_{out}=I_{out}^2 R_o$, wherein $I_{out}$ is output current flowing through the heating element $R_o$ and given by $$I_{out} = \frac{V_{C1}}{R_o}.$$

Therefore, $P_{out}$ may be given by $$P_{out} = \frac{V_{C1}^2}{R_o}$$

when the switch 210S is closed.

The total energy $E_1$ transferred to the heating element 290 over the period from t0 to t1 is proportional the area under waveform of the $P_{out}$ as shown in FIG. 5 which is given by $$E_1 = k_1 \int_{t0}^{t1} \frac{V_{C1}^2}{R_o} dt,$$

where $k_1$ is a constant.

Referring to FIGS. 4B and 5. When the switch 210S is switched off (open) at t1, and remains open from t1 to t2 for an off-time $t_{OFF}$, the inductor 210L is discharged with a discharging current $I_{L1}$ flowing through a LCR circuit formed with the capacitor 210C and the heating element 290. The current $I_{L1}$ flowing through the inductor 210L decreases from the maximum current Imax to the minimum current Imin from t1 to t2 shown in FIG. 5. Energy stored in the inductor 210L is transferred through the DC-blocking capacitor 210C to the heating element 290.

The capacitor is charged up with the DC component of the discharging current $I_{L1}$ from the inductor 210L. The voltage $V_{C1}$ across the capacitor 210C increases from the minimum voltage Vmin to the maximum voltage Vmax from t1 to t2 as shown in FIG. 5. AC component of the induction current $I_{L1}$ is passed through the capacitor 210C and applied to the heating element 290, generates a current $I_{out}$ flowing from the first terminal 291 to the secondary terminal 292 of the heating element 290. Energy is transferred to the heating element 290 and generate a heating power $P_{out}$.

The heating power $P_{out}$ may be given by $P_{out}=I_{out}^2 R_o$, wherein $I_{out}$ is output current flowing through the heating element $R_L$, which is equal to the induction current of $I_{L1}$. Therefore, $P_{out}$ may be given by $P_{out}=I_{L1}^2 R_o$ when the switch 210S is open.

The total energy $E_2$ transferred to the heating element 290 from t1 to t2 is proportional the area under waveform of the heating power $P_{out}$ over the period from t1 to t2 as shown FIG. 5 and is equal to $E_2=k_2\int_{t1}^{t2} I_{L1}^2 R_o$ dt, where $k_2$ is a constant.

Preferably, the capacitance C1 of DC-blocking capacitor 210C and the inductance L1 of the inductor 210L may be selected such that the on-time $t_{ON}$ of the switch 210S is significantly smaller than a discharging time constant $\tau_1$ of the RC loop formed with the capacitor 210C and heating element 290, where $\tau_1$ is given by $\tau_1=R_o C_1$, and the off-time $t_{OFF}$ of the switch 210S is significantly smaller than a resonance time constant $\tau_2$ of a LCR circuit formed with the capacitor 210C, inductor 210L and the heating element 290, where $\tau_2$ is given by $\tau_2=2\pi\sqrt{L_1 C_1}$.

Alternatively, for a selected value of C1 and a selected value of L1, the controller may be configured to switch on and off the power switch at a switching frequency $f_{sw}$ such that the on-time $t_{ON}$ of the switch 210S is significantly smaller than the discharging time constant $\tau_1$ of the RC loop and the off-time $t_{OFF}$ of the switch 210S is significantly smaller than the resonance time constant $\tau_2$ of the capacitor 210C and inductor 210L.

In some embodiments, the on-time $t_{ON}$ is equal to or less than ⅓ of the discharging time constant $\tau_1$. The off-time $t_{OFF}$ is equal to or less than ⅓ of the resonance time constant $\tau_2$.

Figure 6:
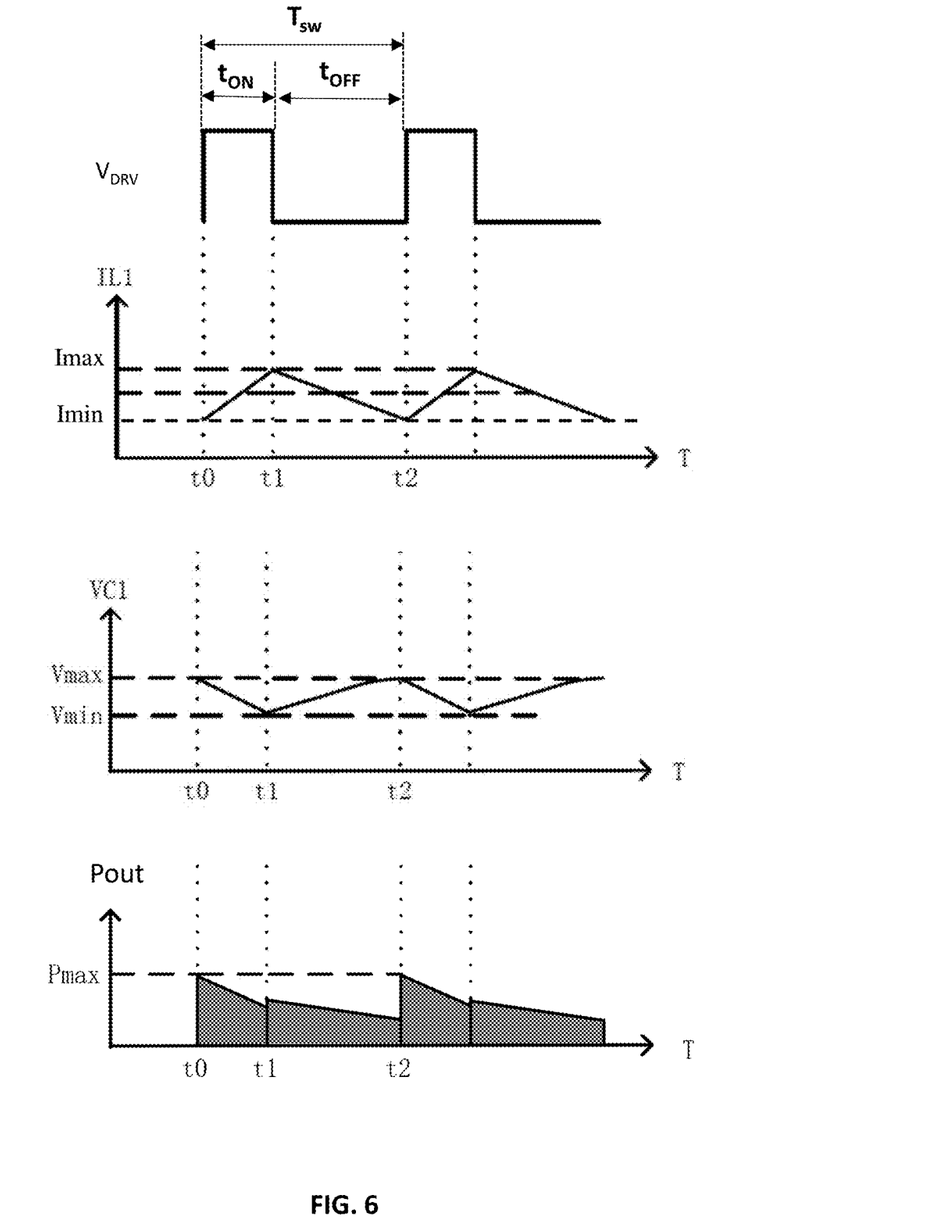
FIG. 6 depicts exemplary signal waveforms of the electronic heating type device according to another embodiment of the present invention.

FIG. 6 depicts signal waveforms of the electronic heating type device when the on-time $t_{ON}$ is equal to ⅓ of the discharging time constant $\tau_1$ and the off-time $t_{OFF}$ is equal to ⅓ of the resonance time constant $\tau_2$.

Referring to FIG. 6. When the switch 210S is switched on (closed) at t0, and remains closed from t0 to t1 for an on-time $t_{ON}$, the voltage $V_{C1}$ across the capacitor 210C decrease from a maximum voltage Vmax to a minimum voltage Vmin and has an approximately linear discharging waveform over $t_{ON}$. Similarly, the heating power $P_{out}$ has an approximately linear waveform over $t_{ON}$. The energy transferred to the heating element 290 over $t_{ON}$ which is proportional the area under waveform of the heating power $P_{out}$ from t0 to t1 (the grey area) can be maximized.

When the switch 210S is switched off (open) at t1, and remains open from t1 to t2 for an off-time $t_{OFF}$, the induction current $I_{L1}$ flowing through the inductor 210L decreases from a maximum current Imax to a minimum current Imin and has an approximately linear discharging waveform over $t_{OFF}$. Similarly, the heating power $P_{out}$ has an approximately linear waveform over $t_{OFF}$. The energy transferred to the heating element 290 over $t_{OFF}$ which is proportional the area under waveform of the heating power $P_{out}$ from t1 to t2 (the grey area) can be maximized.

Referring back to FIGS. 2 and 3. The electronic heating type device may further comprise a current sensor 230 configured for providing a current sensing signal $V_{CS}$ to the CS node of the controller, wherein the current sensing signal $V_{CS}$ is indicative of the output current $I_{out}$ flowing through the heating element.

The current sensor 230 may comprise a current sensing resistor 230R having a first terminal 231 electrically connected to the second terminal 292 of the heating element 290, the second terminal 224 of the input capacitor 220, and the second power terminal 216 of the switch 210S; and a second terminal 232 connected to the ground GND. In other embodiments, the current sensing resistor may be a Hall current sensor.

The current sensor 230 may further comprise an operational amplifier 230A. The operational amplifier 230A may have a pair of differential input terminals 234 and 235 electrically coupled across the current sensing resistor 230R and an output terminal 233 electrically connected to the current sensing node CS of the controller 250.

The operational amplifier 230A may be configured to amplify a voltage across the current sensing resistor 230R and generate an amplified current sensing signal $V_{CS}$ to the CS node of the controller 250. As the voltage across the current sensing resistor 230R is equal to $R_1 * I_{out}$, where R1 is the resistance of the current sensing resistor, the current sensing signal $V_{CS}$ may be given by $V_{CS}=g_1 R_1 I_{out}$, where $g_1$ is the gain of the operational amplifier 230A.

The electronic heating type device may further comprise a voltage divider 280 configured for providing a voltage sensing signal $V_{VS}$ to the voltage sensing (VS) node of the controller 250, wherein the voltage sensing signal is indicative of input voltage Vin supplied by the power supply 200.

The voltage divider 280 may comprise a first voltage dividing resistor 280R1 and a second voltage dividing resistor 280R2.

The first voltage dividing resistor 280R1 may have a first terminal 281 electrically connected to the positive termina 201 of the power supply 200 and a second terminal 282 electrically connected to the voltage sensing node VS of the controller 250.

The second voltage dividing resistor 280R2 may have a first terminal 283 electrically connected to the node VS of the controller 250 and a second terminal 284 electrically connected to the ground GND.

The voltage sensing signal $V_{VS}$ is the voltage across the second voltage dividing resistor 280R2 which may be given by $$V_{VS} = \frac{R_3}{R_2 + R_3} V_{in},$$

where $R_2$ is the resistance of the first voltage dividing resistor and $R_3$ is the resistance of the second voltage dividing resistor.

The controller 250 may be configured to extract a value of the output current $I_{out}$ from the current sensing signal $V_{CS}$ received through the current sensing node CS. The controller 250 may be configured to extract a value of the input voltage $V_{in}$ from the voltage sensing signal $V_{VS}$ received through the voltage sensing node VS. The controller 250 may be further configured to compute a heating power $P_{com}$ which is given by $P_{com}=\eta V_{in} I_{out}$, where $\eta$ is a ratio between the output voltage $V_{out}$ and the input voltage $V_{in}$ of the power converter 210. In some embodiments, the ratio $\eta$ may be a pre-determined value obtained in the factory.

Based on the computed heating power $P_{com}$, the controller 250 may be further configured to calculate an error value as the difference between the computed heating power and a desired power value $P_{des}$. The controller 250 may be further configured to control switching on and off of the switch 210S to adjust the heating power based on a proportional-integral-derivative (PID) algorithm such that the calculated error value is smaller than a threshold error value.

In some embodiments, the desired power value may be a pre-determined value set up in the factory. In other embodiments, the desired power value may be a user-defined value input through a user-interface such as a touch screen or a button installer in the heating type device.

In some embodiments, the controller 250 may be configured to adjust the heating power under a pulse-width-modulation (PWM) mode. At the PWM mode, the control signal $V_{DRV}$ may be a pulse signal having a fixed frequency and a variable duty cycle. The controller 250 may be configured to adjust the duty cycle of the pulse signal to adjust the heating power. In particular, the controller 250 may be configured to: increase the duty-cycle of the pulse signal to increase the heating power when the computed heating power is lower than the desired power value for an amount greater than the threshold error value; and decrease the duty-cycle of the pulse signal to decrease the heating power when the computed heating power is higher than the desired power value for an amount greater than the threshold error value.

In other embodiments, the controller 250 may be configured to adjust the heating power under a fixed-on-time mode. At the fixed-on-time mode, the control signal $V_{DRV}$ may be a pulse signal having a fixed on-time and a variable off-time. The controller 250 may be configured to adjust the off-time of the pulse signal to adjust the heating power. In particular, the controller 250 may be configured to: decrease the off-time of the pulse signal to increase the heating power when the computed heating power is lower than the desired power value for an amount greater than the threshold error value; and increase the off-time of the pulse signal to decrease the heating power when the computed heating power is higher than the desired power value for an amount greater than the threshold error value.

In other embodiments, the controller 250 may be configured to adjust the heating power under a fixed-off-time mode. At the fixed-off-time mode, the control signal $V_{DRV}$ may be a pulse signal having a fixed off-time and a variable on-time. The controller 250 may be configured to adjust the on-time of the pulse signal to adjust the heating power. In particular, the controller 250 may be configured to: increase the on-time of the pulse signal to increase the heating power when the computed heating power is lower than the desired power value for an amount greater than the threshold error value; and decrease the on-time of the pulse signal to decrease the heating power when the computed heating power is higher than the desired power value for an amount greater than the threshold error value.

In other embodiments, the controller 250 may be configured to adjust the heating power under a frequency-modulation (FM) mode. At the FM mode, the control signal $V_{DRV}$ may be a pulse signal having a fixed duty cycle and a variable frequency. The controller 250 may be configured to adjust the frequency of the PWM signal to adjust the heating power. In particular, the controller 250 may be configured to: increase the frequency of the pulse signal to increase the heating power when the computed heating power is lower than the desired power value for an amount greater than the threshold error value; and decrease the frequency of the pulse signal to decrease the heating power when the computed heating power is higher than the desired power value for an amount greater than the threshold error value.

Figure 7A:
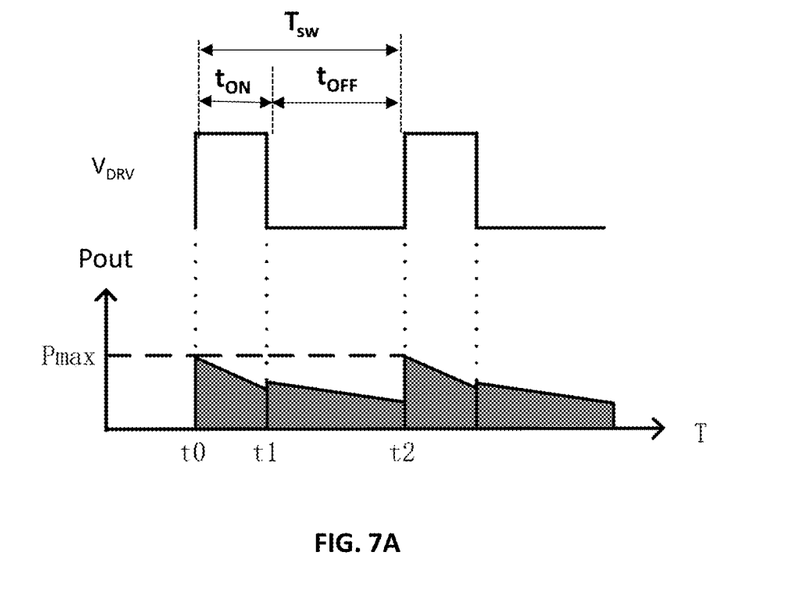
FIGS. 7A and 7B depict signal waveforms of heating power of the power converter driven with two control signals having different duty-cycles respectively.
Figure 7B:
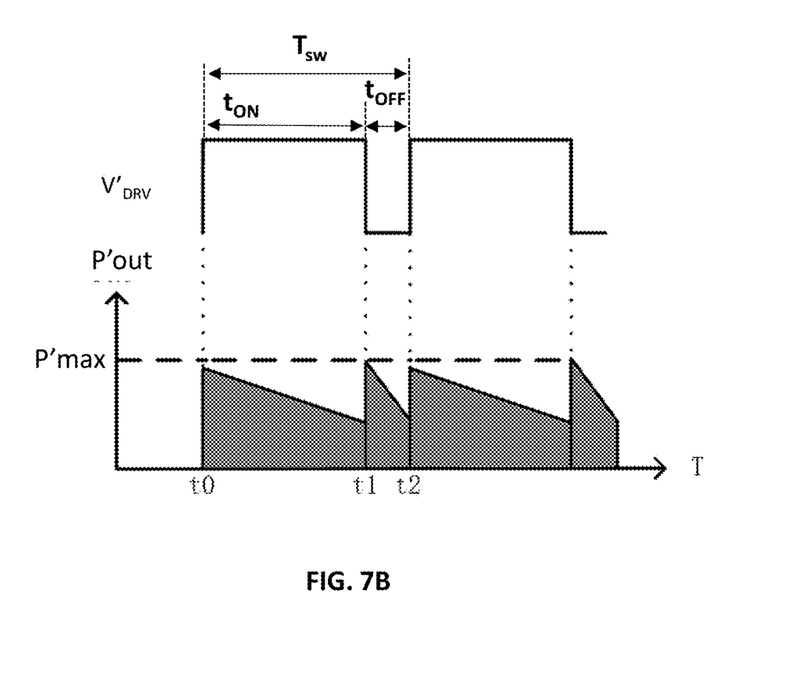

FIGS. 7A and 7B depict waveforms of heating power $P_{out}$ of the electronic heating type device operating at PWM mode and driven with two different control signals $V_{DRV}$ and $V_{DRV}'$ respectively. Duty cycle of the control signal $V_{DRV}$ in FIG. 7A is smaller than duty cycle of the control signal $V_{DRV}'$ in FIG. 7B.

Comparing FIG. 7A and FIG. 7B. The area under waveform of heating power $P_{out}$ from t0 to t2 (the grey area) as shown in FIG. 7A is smaller than the area under waveform of heating power $P_{out}$ from t0 to t2 (the grey area) as shown in FIG. 7B. Therefore, the energy transferred to the heating element 290 in each switching cycle period $T_{sw}$ is increased as the duty cycle is increased.

Figure 8:
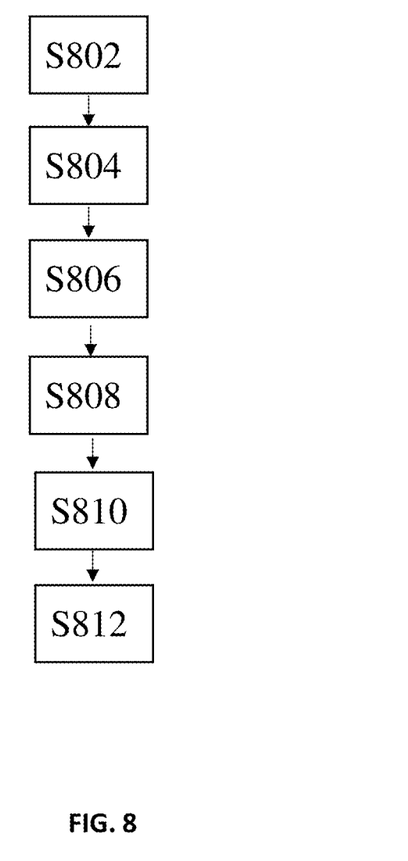
FIG. 8 depicts a flow chart of a control method for operating the electronic heating type device according to some embodiments of the subject application.

FIG. 8 depicts a flow chart of a control method for operating the electronic heating type device according to some embodiments of the subject application. Referring to FIG. 8, the method may comprise the following steps:

S802: Generating a control signal to switch on the power switch for an on-time $t_{ON}$ and switch off the power switch for an off-time $t_{OFF}$ alternately;

S804: Receiving a current sensing signal indicative of an output current flowing through the heating element;

S806: Receiving a voltage sensing signal indicative of an input voltage supplied by the power supply;

S808: Computing a heating power based on the input voltage supplied by the power supply and the output current flowing through the heating element;

S810: Calculating an error value as the difference between the computed heating power and a desired power value; and S812: Adjusting the heating power by controlling switching on and off of the power switch based on a proportional-integral-derivative (PID) algorithm to keep the calculated error value to be smaller than a threshold error value.

In some embodiments, the adjustment of the heating power may be performed under a pulse-width-modulation (PWM) mode. At the PWM mode, the control signal may be a pulse signal having a fixed frequency and a variable duty cycle and the step S812 may comprise adjusting the duty cycle of the pulse signal to adjust the heating power. In particular, Step S812 may comprise: increasing the duty-cycle of the pulse signal to increase the heating power when the computed heating power is lower than the desired power value for an amount greater than the threshold error value; and decreasing the duty-cycle of the pulse signal to decrease the heating power when the computed heating power is higher than the desired power value for an amount greater than the threshold error value.

In other embodiments, the adjustment of the heating power may be performed under a fixed-on-time mode. At the fixed-on-time mode, the control signal may be a pulse signal having a fixed on-time and a variable off-time and the step S812 may comprise adjusting the off-time of the pulse signal to adjust the heating power. In particular, the step S812 may comprise: decreasing the off-time of the pulse signal to increase the heating power when the computed heating power is lower than the desired power value for an amount greater than the threshold error value; and increasing the off-time of the pulse signal to decrease the heating power when the computed heating power is higher than the desired power value for an amount greater than the threshold error value.

In other embodiments, the adjustment of the heating power may be performed under a fixed-off-time mode. At the fixed-off-time mode, the control signal $V_{DRV}$ may be a pulse signal having a fixed off-time and a variable on-time and the step S812 may comprise adjusting the on-time of the pulse signal to adjust the heating power. In particular, the step S812 may comprise: increasing the on-time of the pulse signal to increase the heating power when the computed heating power is lower than the desired power value for an amount greater than the threshold error value; and decreasing the on-time of the pulse signal to decrease the heating power when the computed heating power is higher than the desired power value for an amount greater than the threshold error value.

In other embodiments, the adjustment of the heating power may be performed under a frequency-modulation (FM) mode. At the FM mode, the control signal may be a pulse signal having a fixed duty cycle and a variable frequency and the step S812 may comprise adjusting the frequency of the PWM signal to adjust the heating power. In particular, and the step S812 may comprise: increasing the frequency of the pulse signal to increase the heating power when the computed heating power is lower than the desired power value for an amount greater than the threshold error value; and decreasing the frequency of the pulse signal to decrease the heating power when the computed heating power is higher than the desired power value for an amount greater than the threshold error value.

The foregoing description of the subject application has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. An electronic heating type device comprising:
   a power supply having a positive terminal and a negative terminal;
   a heating element having a first terminal and a second terminal;
   a power converter configured for receiving a DC input voltage from the power supply and generate an AC output voltage to the heating element, the power converter comprising:
   an inductor having a first terminal and a second terminal, the first terminal of the inductor being electrically connected to the positive terminal of the power supply;
   a DC blocking capacitor having a first terminal and a second terminal, the first terminal of the DC blocking capacitor being electrically connected to the second terminal of the inductor and the second terminal of the DC blocking capacitor being electrically connected to the first terminal of the heating element; and a power switch having a first power terminal, a second power terminal and a control terminal, the first power terminal of the power switch being electrically connected to the second terminal of the inductor and the first terminal of the DC blocking capacitor; and a controller having a control driving node electrically connected to the control terminal of the power switch and being configured to generate a control driving signal to switch on the power switch for an on-time $t_{ON}$ and switch off the power switch for an off-time $t_{OFF}$ alternately such that:

when the power switch is switched on, the inductor is charged up with a charging current supplied by the power supply, energy generated from the power supply is transferred to and stored in the inductor, the DC-blocking capacitor is discharged through a RC circuit formed with the heating element, energy stored in the DC-blocking capacitor is transferred to the heating element to generate heating power;

when the switch is switched off, the inductor is discharged with a discharging current flowing through a LCR circuit formed with the DC-blocking capacitor and the heating element, energy stored in the inductor is transferred through the DC-blocking capacitor to the heating element to generate heating power;

wherein the controller further comprises:

a current sensing node configured to receive a current sensing signal indicative of an output current flowing through the heating element; and a voltage sensing node configured to receive a voltage sensing signal indicative of an input voltage supplied by the power supply; and wherein the controller is further configured to:

compute a heating power based on the input voltage supplied by the power supply and the output current flowing through the heating element;

calculate an error value as a difference between the computed heating power and a desired power value;

control switching on and off of the power switch to adjust the heating power based on a proportional-integral-derivative (PID) algorithm such that the calculated error value is kept to be smaller than a threshold error value.

2. The electronic heating type device according to claim 1, further comprise a current sensor configured for providing the current sensing signal to the current sensing node of the controller and comprising:

a current sensing resistor having a first terminal electrically connected to the second terminal of the heating element and the second power terminal of the power switch; and a second terminal electrically connected to the ground GND; and an operational amplifier having a pair of differential input terminals electrically coupled across the current sensing resistor and an output terminal electrically connected to the current sensing node of the controller.

3. The electronic heating type device according to claim 2, further comprise a voltage divider configured for providing the voltage sensing signal to the voltage sensing node of the controller and comprising:

a first voltage dividing resistor having a first terminal electrically connected to the positive terminal of the power supply and a second terminal electrically connected to the voltage sensing node of the controller; and a second voltage dividing resistor having a first terminal electrically connected to the voltage sensing node of the controller and a second terminal electrically connected to the ground GND.

4. The electronic heating type device according to claim 1, wherein the control driving signal is a pulse signal having a fixed frequency and a variable duty cycle; and the controller is further configured to adjust the duty cycle of the pulse signal to adjust the heating power.

5. The electronic heating type device according to claim 4, wherein the controller is further configured to:

increase the duty-cycle of the pulse signal when the computed heating power is lower than the desired power value for an amount greater than a threshold error value; and decrease the duty-cycle of the pulse signal when the computed heating power is higher than the desired power value Pref for an amount greater than the threshold error value.

6. The electronic heating type device according to claim 1, wherein the control driving signal is a pulse signal having a fixed on-time and a variable off-time; and the controller is further configured to adjust the off-time of the pulse signal to adjust the heating power.

7. The electronic heating type device according to claim 6, wherein the controller is further configured to:

decrease the off-time of the pulse signal when the computed heating power is lower than the desired power value Pref for an amount greater than a threshold error value; and increase the off-time of the pulse signal when the computed heating power is higher than the desired power value Pref for an amount greater than the threshold error value.

8. The electronic heating type device according to claim 1, wherein the control driving signal is a pulse signal having a fixed off-time and a variable on-time; and the controller is further configured to adjust the on-time of the pulse signal to adjust the heating power.

9. The electronic heating type device according to claim 8, wherein the controller is further configured to:

increase the on-time of the pulse signal when the computed heating power is lower than the desired power value Pref for an amount greater than a threshold error value; and decrease the on-time of the pulse signal when the computed heating power is higher than the desired power value Pref for an amount greater than the threshold error value.

10. The electronic heating type device according to claim 1, wherein:

the control driving signal is a pulse signal having a fixed duty cycle and a variable frequency; and the controller is further configured to adjust the frequency of the pulse signal to adjust the heating power.

11. The electronic heating type device according to claim 10, wherein the controller is further configured to:

increase the frequency of the pulse signal when the computed heating power is lower than the desired power value Pref for an amount greater than a threshold error value; and decrease the frequency of the pulse signal when the computed heating power is higher than the desired power value Pref for an amount greater than the threshold error value.

12. The electronic heating type device according to claim 1, wherein:
the on-time $t_{ON}$ is significantly shorter than a discharging time constant $\tau_1$ of the RC circuit formed with the DC blocking capacitor and the heating element, where $\tau_1$ is given by $\tau_1=C_1R_o$, $C_1$ the capacitance of the DC blocking capacitor and $R_o$ is the equivalent resistance of the heating element; and
the off-time $t_{OFF}$ is significantly shorter than a resonance time constant $\tau_2$ of the LRC circuit formed with the DC blocking capacitor, the inductor and the heating element, where $\tau_2$ is given by $\tau_2=2\pi\sqrt{L_1C_1}$, and $L_1$ is the inductance of the inductor.

13. The electronic heating type device according to claim 12, wherein:
the on-time $t_{ON}$ is equal to or less than ⅓ of the discharging time constant $\tau_1$.

14. The electronic heating type device according to claim 12, wherein:
the off-time $t_{OFF}$ is equal to or less than ⅓ of the resonance time constate $\tau_2$.

15. A method for operating the electronic heating type device comprising a power supply, a heating element and a power converter configured for receiving a DC input voltage from the power supply and generate an AC output voltage to the heating element, the power converter comprising an inductor, a DC-blocking capacitor and a power switch; the method comprise:
generating a control signal to switch on the power switch for an on-time $t_{ON}$ and switch off the power switch for an off-time $t_{OFF}$ alternately;
receiving a current sensing signal indicative of an output current flowing through the heating element;
receiving a voltage sensing signal indicative of an input voltage supplied by the power supply;
computing a heating power based on the input voltage supplied by the power supply and the output current flowing through the heating element;
calculating an error value as a difference between the computed heating power and a desired power value;
adjusting the heating power by controlling switching on and off of the power switch based on a proportional-integral-derivative (PID) algorithm to keep the calculated error value to be smaller than a threshold error value.

16. The method according to claim 15, wherein:
the control signal is a pulse signal having a fixed frequency and a variable duty cycle; and
adjustment of the heating power is performed under a pulse-width modulation mode by:
increasing the duty-cycle of the pulse signal to increase the heating power when the computed heating power is lower than the desired power value for an amount greater than the threshold error value; and
decreasing the duty-cycle of the pulse signal to decrease the heating power when the computed heating power is higher than the desired power value for an amount greater than the threshold error value.

17. The method according to claim 15, wherein:
the control signal is a pulse signal having a fixed on-time and a variable off-time; and
adjustment of the heating power is performed under a fixed-on-time mode by:
decreasing the off-time of the pulse signal to increase the heating power when the computed heating power is lower than the desired power value for an amount greater than the threshold error value; and
increasing the off-time of the pulse signal to decrease the heating power when the computed heating power is higher than the desired power value for an amount greater than the threshold error value.

18. The method according to claim 15, wherein:
the control signal is a pulse signal having a fixed off-time and a variable on-time; and
adjustment of the heating power is performed under a fixed-off-time mode by:
increasing the on-time of the pulse signal to increase the heating power when the computed heating power is lower than the desired power value for an amount greater than the threshold error value; and
decreasing the on-time of the pulse signal to decrease the heating power when the computed heating power is higher than the desired power value for an amount greater than the threshold error value.

19. The method according to claim 15, wherein:
the control signal is a pulse signal having a fixed duty cycle and a variable frequency; and
adjustment of the heating power is performed under a frequency-modulation mode by:
increasing the frequency of the pulse signal to increase the heating power when the computed heating power is lower than the desired power value for an amount greater than the threshold error value; and
decreasing the frequency of the pulse signal to decrease the heating power when the computed heating power is higher than the desired power value for an amount greater than the threshold error value.

* * * * *